US005654777A

United States Patent [19]

Shin

[11] Patent Number: 5,654,777

[45] Date of Patent: Aug. 5, 1997

[54] METHOD FOR CONTROLLING DISPLAY OF VIDEO DATA ON AN LCD AND CIRCUIT FOR IMPLEMENTING THE SAME

[75] Inventor: Young-min Shin, Seoul, Rep. of Korea

[73] Assignee: Samsung Electronics Co., Ltd., Suwon, Rep. of Korea

[21] Appl. No.: 443,284

[22] Filed: May 17, 1995

[30] Foreign Application Priority Data

May 17, 1994 [KR] Rep. of Korea ........................ 94-10775

[51] Int. Cl.$^{6}$ ........................................................ H04N 3/14

[52] U.S. Cl. .......................... 348/793; 348/790; 348/792; 345/213

[58] Field of Search .................................... 348/446, 447, 348/448, 449, 791–793, 790; 345/213–214, 87–88, 100, 152, 98; H04N 3/14, 9/30

[56] References Cited

U.S. PATENT DOCUMENTS 5,311,205 5/1994 Hamada .................................... 345/88

5,400,050 3/1995 Matsumoto ............................. 345/100

5,418,547 5/1995 Mizukata .................................. 345/98

5,422,658 6/1995 Kawaguchi ............................. 345/213

*Primary Examiner*—Sherrie Hsia

*Attorney, Agent, or Firm*—Cushman Darby & Cushman, IP Group of Pillsbury Madison & Sutro LLP

[57] ABSTRACT

A method for controlling display video data on an LCD panel having a display matrix of pixels arranged in rows and columns and having a delta structure, which includes the steps of displaying the video data in its original (unchanged) form during a first field of the video data, and displaying the video data in a modified form during a second field of the video data, with alternate (e.g., odd-numbered) lines of the video data being shifted one pixel towards a first (e.g., right) side of the display matrix. A control circuit for implementing this method generates first and second control signals for controlling the operation of a column driving circuit which drives the columns of pixels of the display matrix in the appropriate manner.

16 Claims, 5 Drawing Sheets

METHOD FOR CONTROLLING DISPLAY OF VIDEO DATA ON AN LCD AND CIRCUIT FOR IMPLEMENTING THE SAME

BACKGROUND OF THE INVENTION

The present invention relates generally to liquid crystal display devices (LCDs), and, more particularly, to a method for controlling the display of video data on a display panel of the the LCD, and a circuit for implementing the same.

Generally, in displaying video data on the display panel of a conventional LCD, a problem of image quality arises due to its delta (triangular) structure of the LCD panel. Namely, the outline of the displayed image appears uneven.

With reference now to FIG. 1, a conventional LCD will now be described. More particularly, the conventional LCD includes an LCD display panel 1 having a delta structure and comprised of a matrix of pixels arranged in rows and columns, a gate driving circuit 2 for driving odd-numbered rows of pixels, a gate driving circuit 3 for driving even-numbered rows of pixels, a source driving circuit 4 for applying video data to odd-numbered columns of pixels, and a source driving circuit 5 for applying video data to even-numbered columns of pixels.

With this configuration, the the odd-numbered rows of pixels are aligned in vertical registration with one another, and the even-numbered rows of pixels are aligned in vertical registration with one another, but offset with respect to the odd-numbered rows of pixels, so that the columns of pixels have a zig-zag configuration. As such, when a rectangular image, for example, is displayed on the display panel 1, as shown in FIG. 2, the sidelines of the image appear uneven.

Based on the above, it can be appreciated that there presently exists a need in the art for a method for displaying video data on the display panel of an LCD, and a circuit for implementing the same, which overcomes the above-described drawbacks and shortcomings of the presently available technology.

SUMMARY OF THE INVENTION

The present invention encompasses a method for controlling display video data on an LCD panel having a display matrix of pixels arranged in rows and columns and having a delta structure, which includes the steps of displaying the video data in its original (unchanged) form during a first field of the video data, and displaying the video data in a modified form during a second field of the video data, with alternate (e.g., odd-numbered) lines of the video data being shifted one pixel towards a first (e.g., right) side of the display matrix. The present invention also encompasses a control circuit for implementing this method.

BRIEF DESCRIPTION OF THE DRAWINGS

These and various other objects, features, and advantages of the present invention will be readily understood with reference to the following detailed description taken in conjunction with the accompanying drawings, in which.

DETAILED DESCRIPTION OF THE INVENTION

Figure 1:
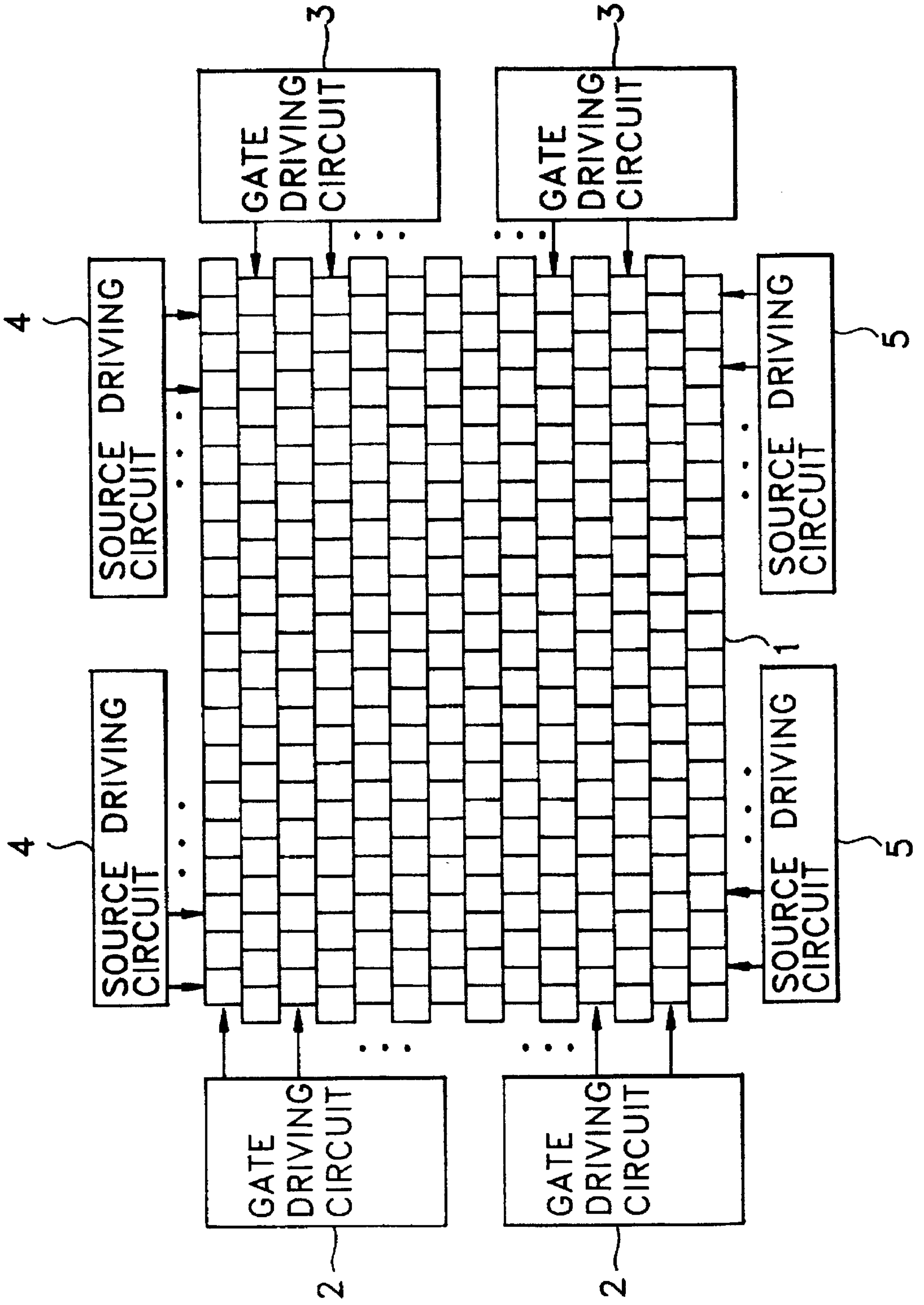
FIG. 1 (PRIOR ART)
FIG. 1 is a block diagram of a conventional LCD, which is utilized in the practice and implementation of the method and circuit of the present invention.
Figure 2:
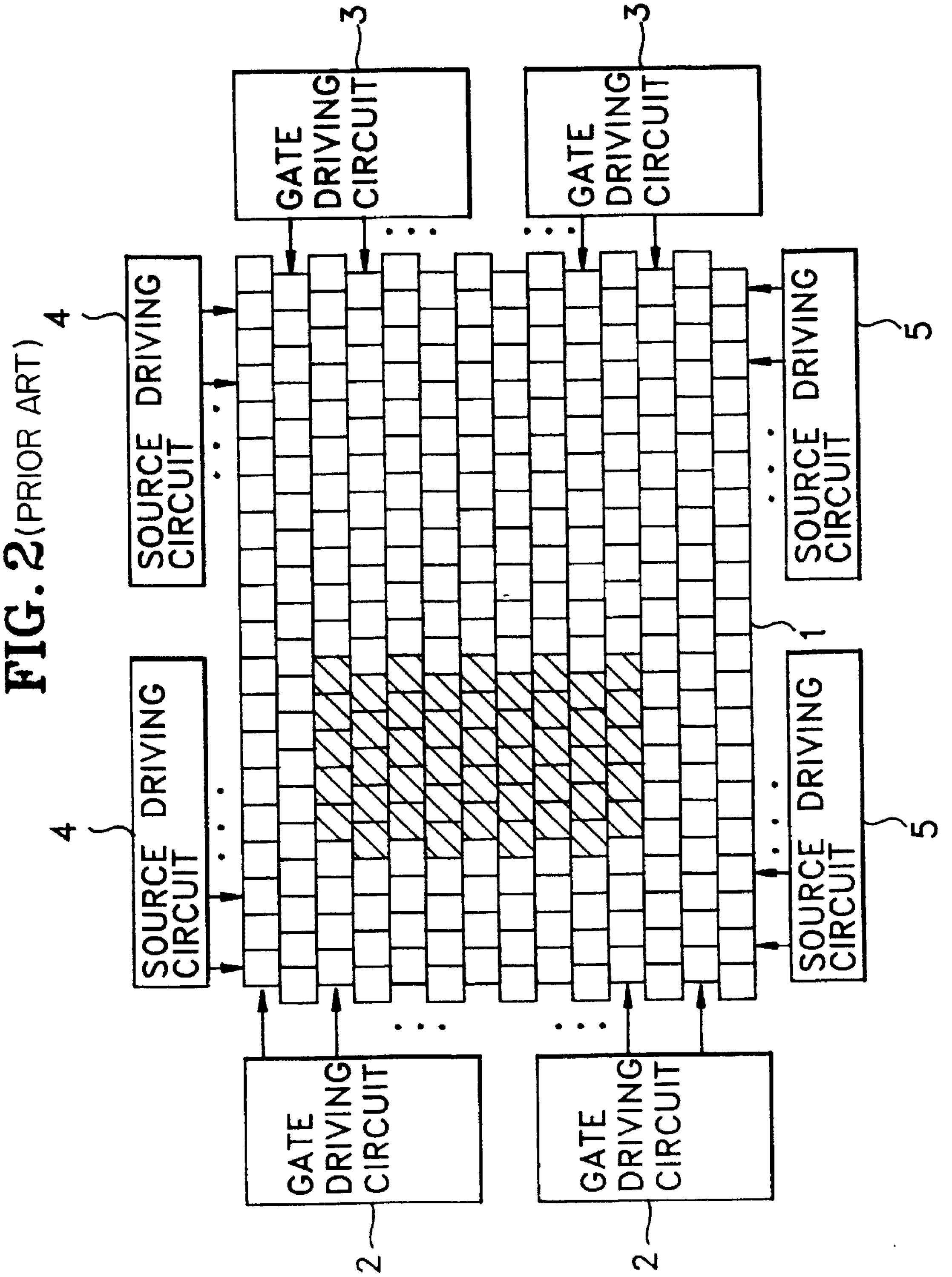
FIG. 2 (PRIOR ART)
FIG. 2 is the same as FIG. 1, except that it additionally depicts a first field of a frame of video data consisting of a rectangular image being displayed on the display panel of the LCD.
Figure 3:
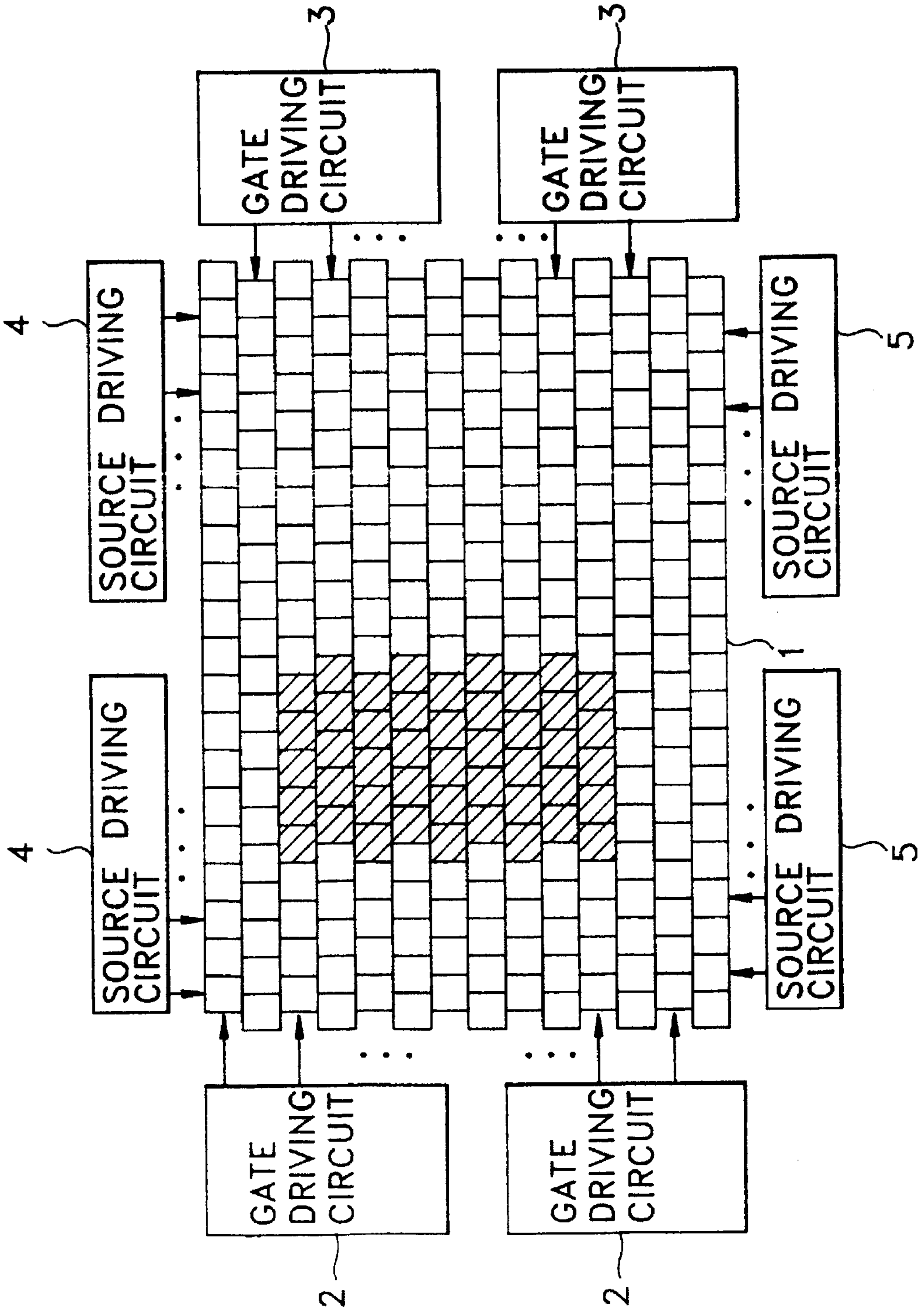
FIG. 3 is the same as FIG. 1, except that it additionally depicts the second field of the frame of video data depicted in FIG. 2 being displayed on the display panel of the LCD in accordance with a preferred embodiment of the present invention.
Figure 4:
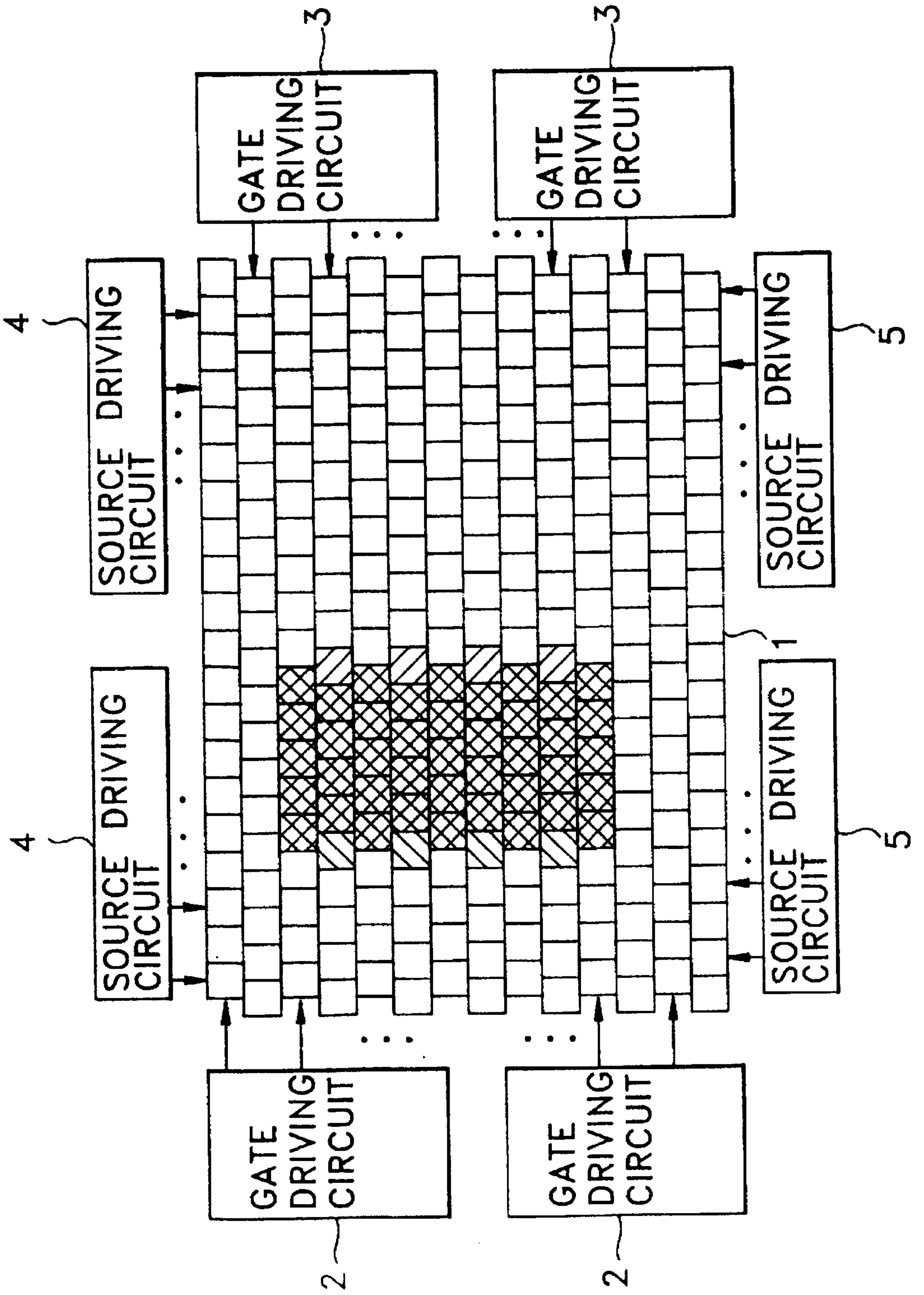
FIG. 4 is the same as FIG. 1, except that it additionally depicts the synthesized image of the first and second fields of video data depicted in FIGS. 2 and 3, being displayed on the LCD in accordance with a preferred embodiment of the present invention.

With reference now to FIGS. 2–8, the method and circuit of a preferred embodiment of the present invention will now be described. More particularly, with specific reference now to FIGS. 2 and 3, in accordance with the method of a preferred embodiment of the present invention, a first field of a frame of video data is displayed on the LCD panel 1 as shown in FIG. 2, and a second field of the same frame of video data is displayed on the LCD panel 1 as shown in FIG. 3, with even-numbered lines of the second field being shifted one pixel towards the right. Otherwise stated, the second field is displayed with the even-numbered lines thereof being displayed starting one pixel towards the right of the starting pixel of the original video data. For instance, in the illustrative example depicted in FIGS. 2 and 3, the even-numbered lines of the first field of the rectangular image are displayed beginning at the fifth pixel from the left (i.e., beginning with the fifth column of pixels), as shown in FIG. 2, and-the even-numbered lines of the second field of the same rectangular image are displayed beginning at the sixth pixel from the left (i.e., beginning with the sixth column of pixels). As can be seen in FIG. 4, the sidelines of the resultant synthesized rectangular image comprised of the combined first and second fields appear more linear to a viewer. In this connection, the common or overlapping portion of the first and second fields, comprised of the double cross-hatched pixels in FIG. 4, appears relatively darker than the non-overlapping portion, comprised of the endmost pixels of the even-numbered lines in FIG. 4 (i.e., the singly cross-hatched pixels), which appear relatively vague to the viewer. As such, the zig-zag sidelines of the displayed image are muted, appear indistinct to the viewer. Additionally, the color interference characteristics of the LCD panel 1 further contribute to the viewer's perception of enhanced linearity of the sidelines of the image relative to the appearance that the image would otherwise have if displayed in the conventional manner, i.e., if the original video data were displayed without any pixel-shifting of the video data of the second field.

It should be noted however, that a similar result could be achieved by shifting the odd-numbered lines of the second field one pixel to the left, or by shifting the odd- or even-numbered lines of the first field one pixel to the left or right, respectively.

Figure 5:
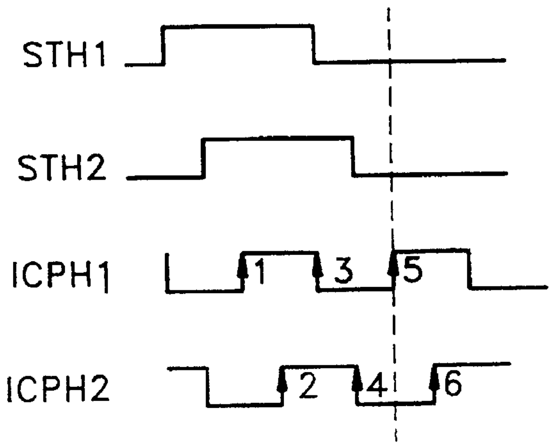
FIG. 5 is a timing diagram depicting the relative timing of the signals utilized to display an odd-numbered line of the first field of the video data depicted in FIG. 2.
Figure 6:
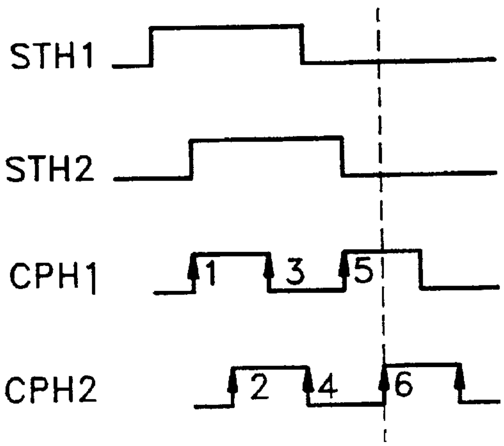
FIG. 6 is a timing diagram depicting the relative timing of the signals utilized to display an even-numbered line of the second field of the video data depicted in FIG. 3.

In general, the above-described method of the preferred embodiment of the present invention can be implemented by manipulating the timing of horizontal carry pulse Signals applied to the source driving circuits 4 and 5 for controlling the enabling of the columns of pixels of the LCD panel 1, in such a manner that, as can be seen in FIGS. 5 and 6, initial (standard) horizontal carry pulse signals ICPH1 and ICPH2 occur one pixel later relative to the horizontal line start signals STH1 and STH2 than do modified horizontal carry pulse signals CPH1 and CPH2.

By way of background, video data is conventionally displayed on the LCD panel 1 by applying the signals depicted in FIG. 5 to the source driving circuits 4 and 5 during both the odd- and even-numbered lines of both the first and second fields of video data. In operation, the video data is applied to the source driving circuits 4 and 5 upon receipt of the vertical sync signal of a corresponding field of video data, which occurs one pixel after the falling edge of the start signal STH2. Prior to this, the horizontal carry pulse signals ICPH1 and ICPH2 cause the columns of pixels corresponding to the numbered upwardly-pointing arrows to be enabled. As such, in the illustrative example of the video data depicted in FIG. 2 (i.e., a rectangular image), the video data would conventionally be displayed beginning with the fifth column of pixels (the dashed vertical line in FIGS. 5 and 6 represents the occurrence of the vertical sync-signal, and thus, the application of the video data to the source driving circuits 4 and 5), for all lines of both fields of the video data.

However, in accordance with the present invention, as can be seen in FIG. 6, modified horizontal carry pulse signals CPH1 and CPH2 are applied to the source driving circuits 4 and 5 during the even-numbered lines of the second field of the video data, in place of the initial (standard) horizontal carry pulse signals ICPH1 and ICPH2, with the result that the first five columns of pixels are enabled prior to the application of the video data to the source driving circuits 4 and 5, thereby causing the video data of the even-numbered lines of the second field to be shifted one pixel to the right relative to the original video data. Otherwise stated, the modified horizontal carry pulse signals CPH1 and CPH2 are advanced by one pixel relative to the initial horizontal carry pulse signals ICPH1 and ICPH2, thereby causing the video data of the even-numbered lines of the second field to be displayed beginning one pixel to the right relative to the normal position the even-numbered lines of the second field would occupy on the display matrix using the conventional display technique. It should be recognized, however, that a similar result could be achieved by shifting the odd-numbered lines of the second field one pixel to the left, or by shifting the odd- or even-numbered lines of the first field one pixel to the left or right, respectively. However, when shifting the odd-numbered lines one pixel to the left, the modified horizontal carry pulse signals CPH1 and CPH2 would be delayed one pixel relative to the initial horizontal carry pulse signals ICPH1 and ICPH2.

Figure 7:
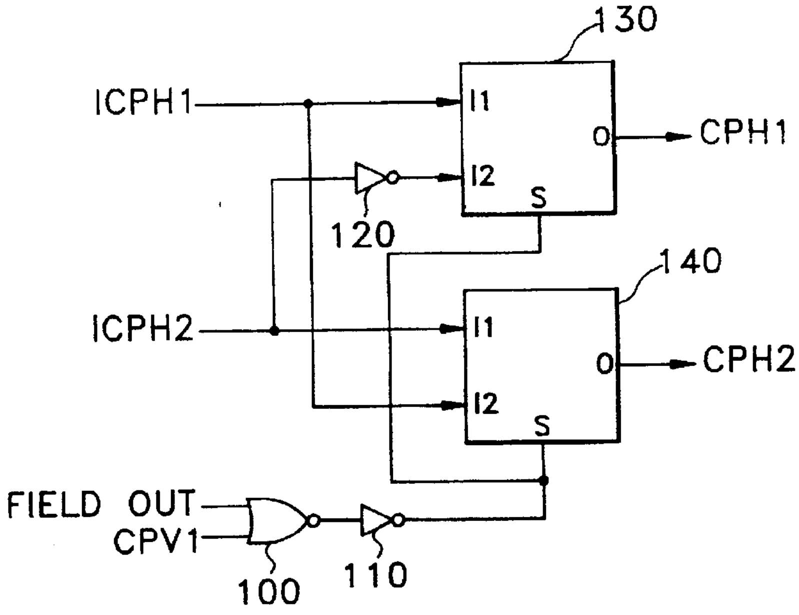
FIG. 7 is a circuit diagram of a carry pulse generating circuit constructed in accordance with a preferred embodiment of the present invention; and, FIG. 8 is a circuit diagram of a field output signal generating circuit constructed in accordance with a preferred embodiment of the present invention.

With reference now to FIG. 7, a carry pulse generating circuit for generating the modified horizontal carry pulse signals CPH1 and CPH2 described above and depicted in FIG. 6, and constructed in accordance with a preferred embodiment of the present invention, will now be described. More particularly, the carry pulse generating circuit of the preferred embodiment of the present invention includes a NOR gate 100 which receives, at a first input thereof, a "FIELD OUT" signal, and, at a second input thereof, a vertical line carry pulse signal "CPV1" signal; an inverter 110 coupled to the output of the NOR gate 100; a first selector circuit 130 having a first input I1 coupled to the initial horizontal carry pulse signal ICPH1, a second input I2 coupled to the the output of an inverter 120 whose input is coupled to the initial horizontal carry pulse signal ICPH2, a select port "S" coupled to the output of the inverter 110, and an output port "O"; and, a second selector circuit 140 having a first input I1 coupled to the initial horizontal carry pulse signal ICPH2, a second input I2 coupled to the initial horizontal carry pulse signal ICPH1, a select port "S" coupled to the output of the inverter 110, and an output port "O".

In operation, when the signal applied to the select port "S" of the selector circuits 130 and 140 goes high, the signal applied to the input port I1 is output through the output port "O", and when the signal applied to the select port "S" of the selector circuits 130 and 140 goes low, the signal applied to the input port I2 is output through the output port "O". Since the signal applied to the select port "S" of the selector circuits 130 and 140 is the output of the inverter 110, then it is only low when both the "FIELD OUT" signal and the vertical line carry pulse signal "CPV1" are both low (since that is the only condition of the inputs to the NOR gate 100 which will cause its output to go high). Thus, the output signals CPH1 and CPH2 are the same as the input signals ICPH1 and ICPH2 at all times when either the "FIELD OUT" signal or the vertical line carry pulse signal "CPV1" is high. However, when it is desired to produce the modified horizontal carry pulse signals CPH1 and CPH2 depicted in FIG. 6, e.g., during even-numbered lines of the second field, the vertical line carry pulse signal "CPV1" and the "FIELD OUT" signals are driven low.

Figure 8:
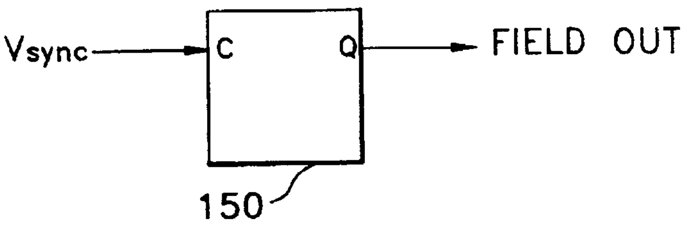

With reference now to FIG. 8, there can be seen a T flip-flop 150 having a clock port "C" and an output port "Q", in which a vertical sync signal $V_{sync}$ is applied to the clock port "C" in order to toggle the "FIELD OUT" signal output via the output port "Q". In this connection, the vertical sync pulse of the first fields of the video data could toggle the "FIELD OUT" signal high, and the vertical sync pulse of the second fields of the video data could toggle the "FIELD OUT" signal low. Similarly, the same type of device could be used to toggle the vertical line carry pulse signal "CPV1" so that is toggled low on even-numbered lines of the video data.

Although a preferred embodiment of the present invention has been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method for controlling display of video data on an LCD panel having a display matrix of pixels arranged in rows and columns, with first alternating ones of said rows being aligned in vertical registration with one another, and second alternating ones of said rows being aligned in vertical registration with one another but offset with respect to said first alternating rows, whereby said columns have a zig-zag configuration, the method comprising the steps of:

displaying said video data in an original form on said display matrix during a first field of said video data; and, displaying said video data in a modified form on said display matrix during a second field of said video data, with alternate lines of said second field of said video data being shifted one pixel towards a first side of said display matrix.

2. The method as set forth in claim 1, wherein said first field of said video data comprises an odd-numbered field of said video data, and said second field of said video data comprises an even-numbered field of said video data.

3. The method as set forth in claim 1, wherein said alternate lines of said second field of said video data comprise even-numbered lines of said second field of said video data.

4. The method as set forth in claim 2, wherein said alternate lines of said second field of said video data comprise even-numbered lines of said second field of said video data.

5. The method as set forth in claim 4, wherein said first side of said display matrix comprises the right side of said display matrix.

6. The method as set forth in claim 1, wherein said first field of said video data comprises an even-numbered field of said video data, and said second field of said video data comprises an odd-numbered field of said video data.

7. The method as set forth in claim 1, wherein said alternate lines of said second field of said video data comprise odd-numbered lines of said second field of said video data.

8. The method as set forth in claim 6, wherein said alternate lines of said second field of said video data comprise odd-numbered lines of said second field of said video data.

9. The method as set forth in claim 8, wherein said first side of said display matrix comprises the left side of said display matrix.

10. A control circuit for controlling display of video data on an LCD panel having a display matrix of pixels arranged in rows and columns, with first alternating ones of said rows being aligned in vertical registration with one another, and second alternating ones of said rows being aligned in vertical registration with one another but offset With respect to said first alternating rows, whereby said columns have a zig-zag configuration, the control circuit comprising:

a column driving circuit for driving said columns of pixels;

a first control signal generating circuit for generating a first control signal for controlling said column driving circuit;

a second control signal generating circuit for generating a second control signal for controlling said column driving circuit; and, wherein said column driving circuit is responsive to said first and second control signals for displaying said video data in an original form on said display matrix during a first field of said video data, and for displaying said video data in a modified form on said display matrix during a second field of said video data, with alternate lines of said second field of said video data being shifted one pixel towards a first side of said display matrix.

11. The circuit as set forth in claim 10, wherein said first field of said video data comprises an odd-numbered field of said video data, and said second field of said video data comprises an even-numbered field of said video data.

12. The circuit as set forth in claim 10, wherein said alternate lines of said second field of said video data comprise even-numbered lines of said second field of said video data.

13. The circuit as set forth in claim 11, wherein said alternate lines of said second field of said video data comprise even-numbered lines of said second field of said video data.

14. The circuit as set forth in claim 13, wherein said first side of said display matrix comprises the right side of said display matrix.

15. The circuit as set forth in claim 14, wherein:

said first control signal generating circuit comprises a first selector circuit having a first input coupled to a first horizontal carry pulse signal, a second input coupled to an inverted second horizontal carry pulse signal, a select port, and an output port;

said second control signal generating circuit comprises a second selector circuit having a first input coupled to a second horizontal carry pulse signal, a second input coupled to said first horizontal carry pulse signal, a select port, and an output port;

a select control signal generating circuit for generating a select control signal coupled to said select port of each of said first and second control signal generating circuits; and, wherein said first and second control signal generating circuits are responsive to said select control signal for outputting said first and second horizontal carry pulse signals in original form as said first and second control signals, respectively, during said first field of said video data, and during odd-numbered lines of said second field of said video data, and for outputting a modified form of said first and second horizontal carry pulse signals as said first and second control signals, respectively, during said even-numbered lines of said second field of said video data, with said modified first and second horizontal carry pulse signals being advanced by one pixel relative to said original first and second horizontal carry pulse signals.

16. The circuit as set forth in claim 15, wherein said select control signal generating circuit comprises:

a NOR gate having a first input coupled to a field out signal, a second input coupled to a vertical carry pulse signal, and an output; and, an inverter having an input coupled to said output of said NOR gate, and an output coupled to said select port of each of said first and second control signal generating circuits.

* * * * *